Patented Mar. 10, 1925.

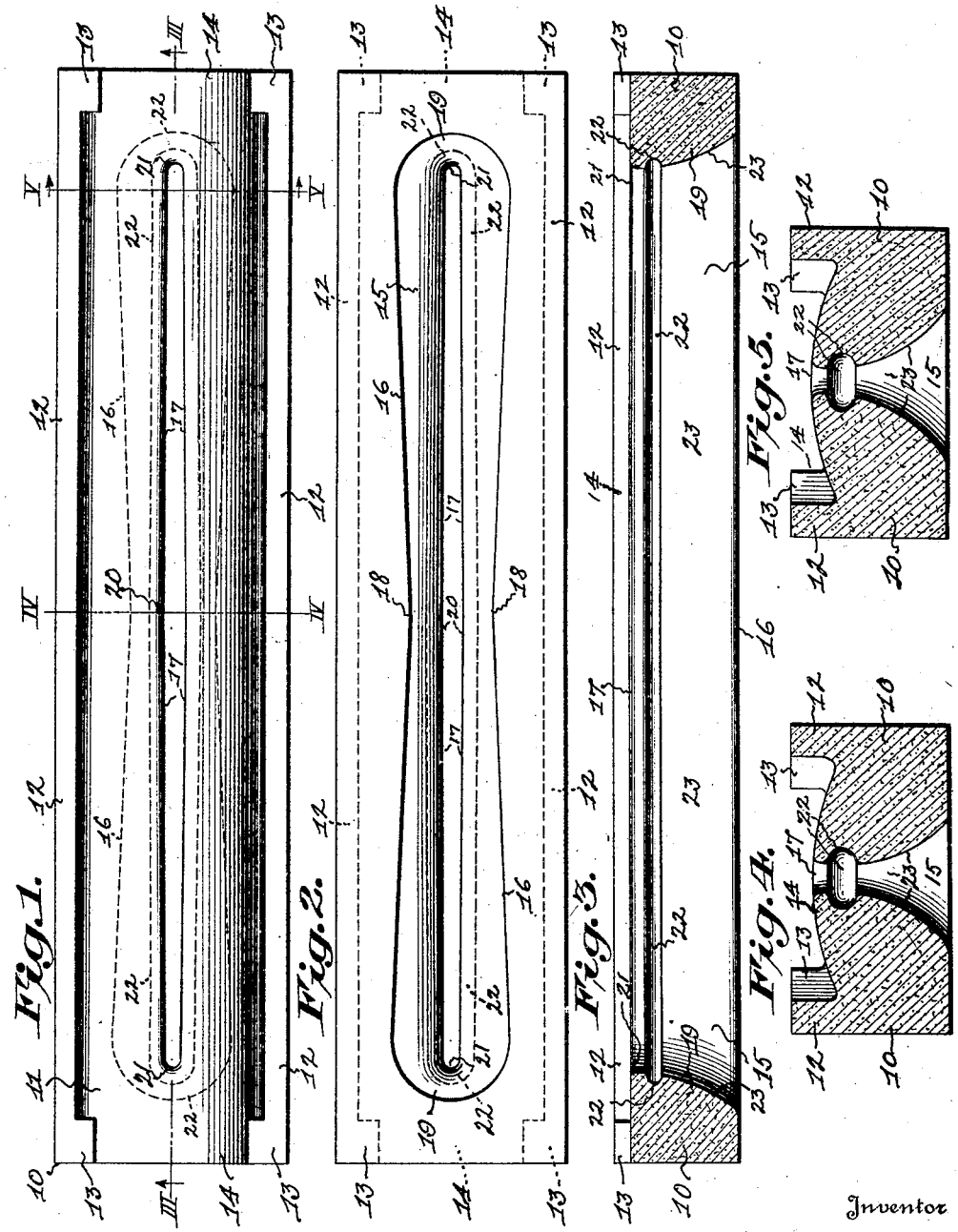

1,529,086

UNITED STATES PATENT OFFICE.

JULES J. QUERTINMONT, OF POINT MARION, PENNSYLVANIA.

SUPPLYING FLOAT FOR DRAWING SHEETS OF GLASS.

Application filed August 2, 1924. Serial No. 729,783.

*To all whom it may concern:*

Be it known that I, JULES J. QUERTINMONT, a citizen of the United States, residing at Point Marion, in the county of Fayette and State of Pennsylvania, have invented certain new and useful Improvements in Supplying Floats for Drawing Sheets of Glass, of which the following is a specification.

This invention relates to the floats or "debiteuse" which are used in connection with the "Fourcault" system of drawing continuous sheets of glass, and is an improvement of the float as shown for example in the U. S. Patent No. 837,822 to Emile Fourcault, dated December 4, 1906, used in connection with an apparatus similar to that disclosed in U. S. Patent No. 837,821 to said Fourcault of the same date.

The objects of the invention are:

First, to provide a supplying-float of the character above indicated in which a sheet of glass is drawn or formed with a surface having a better and more uniform lustre and brilliancy and avoid the formation of a cold line or distortion at any section and throughout the entire width and length of the sheet.

Second, to so construct and form the supplying-float in order that a wall or body of molten glass is disposed or arranged in the float at the section or point just prior to the formation of the sheet takes place and at the same time preserve the temperature of the edges of the slot of the float forming the sheet at a uniform and proper heat thereby insuring that the sheet of formed or drawn glass will be hotter than heretofore and effect a more uniform and proper temperature of the molten glass as it is being drawn and formed into a sheet while passing up, out and away from the supplying-float and enable said sheet of drawn glass to cool properly and uniformly throughout its exterior plane surfaces and in its interior and produce a sheet of glass of better lustre and unusual brilliancy and without the formation of cold lines than heretofore accomplished in glass drawing apparatus.

Third, to construct a supplying-float for drawing sheet glass which will efficiently, quickly and cheaply carry out all the operations, functions and advantages hereinbefore pointed out without the use of skilled artisans, careful adjustments, or auxiliary mechanism which involves the use of supplemental heating or cooling of the formed sheet of glass as it leaves the supplying-float or shortly thereafter.

Fourth, to construct, proportion and arrange an undercut groove within and on each side wall of a slot forming a sheet of glass drawing opening, so that the flow and temperature of the molten glass through said opening are uniform throughout its entire width and the friction of said molten glass against the side walls of the opening is reduced to a minimum.

Fifth, to construct a supplying-float having such characteristics, functions, and mode of operation herein recited which will have a long life and high efficiency, simple in construction, and easily and cheaply manufactured.

Sixth, other objects and advantages of the improved supplying-float or "debiteuse" will appear from the detailed description of the construction and arrangement of the parts and mode of operation to be hereinafter given.

The invention consists of structural characteristics and relative arrangements of elements which will be hereinafter more fully described and particularly pointed out in the appended claims.

In the drawings in which similar reference characters indicate the same parts in the several figures:

Figure 1 is a top plan view of the supplying-float or "debiteuse".

Figure 2 is a bottom plan view.

Figure 3 is a longitudinal section taken on the line III—III of Figure 1.

Figure 4 is a transverse section on line IV—IV of Figure 1, and

Figure 5 is a transverse section on line V—V of Figure 1.

Referring to the drawings, 10 represents the supplying-float or "debiteuse" which is preferably elongated and rectangular in cross-section, and is provided on its upper side with a rectangular depression 11, formed by the longitudinal walls 12, 12 and end walls 13, 13, said end walls are partially cut out or removed to form end passageways 14, 14 for the purpose of scraping out or removing any broken glass, foreign matter, or splinters which may become detached from the drawn glass or otherwise drop into said pocket or depression 11, without being required or necessitating the elevation or raising of said broken glass or foreign matter with care and special tools. The bottom of said rectangular depression 11 is elevated at its longitudinal center portion and slopes towards the side walls 12, 12, as shown in Figures 4 and 5, for the purpose of causing any detached or free particles of glass or other matter to quickly gravitate away from the high or center section and collect in the lower side sections of the depression 11 and thereby prevent said particles of glass becoming attached from being dragged towards and into the moving sheet of glass drawn through the float, as will be readily understood.

15 is a longitudinal slot arranged in a vertical plane passing through the longitudinal axis of the supplying-float 10, and is of such a length as to be substantially of the same dimension as the width of the glass sheet to be drawn, and accordingly varies depending on what width of glass sheet is to be drawn as will be readily understood.

The cross section of said slot 15 varies and as will be clearly seen by reference to Figures 4 and 5, contracts from its enlarged lower opening 16 to its narrow upper and sheet forming opening 17, and said lower opening 16 has a varying width and increases from its middle section 18 to each of its extremities or ends 19, 19 and curved, as clearly shown in Figure 2, while the upper and sheet forming opening 17 of said slot 15 is narrow and preferably decreases or tapers from its middle section 20 to each of its ends 21, 21, as clearly illustrated in Figure 1, and the proportions of the width of the upper or sheet forming opening 17 varies, depending upon the thickness of the sheet glass to be drawn or formed.

22, 22 are undercut elongated and narrow grooves, depression or incision formed, cut or molded in the upper section of each of the walls 23 of the slot 15 and said grooves are arranged oppositely to and parallel to each other and parallel and near the upper or sheet forming opening 17, as clearly shown in Figures 3 and 4, and for the purposes to be more fully and presently explained.

Said grooves 22, 22 are so proportioned and arranged to extend entirely around and parallel a short distance of the upper opening 17, as clearly shown in Figures 2 and 3, and the functions of said grooves or undercuts 22, are for the purpose of intercepting and retaining for a short interval of time a body of highly heated molten glass which will entirely and uniformly heat the sheet forming edges of the upper opening 17 and prevent too sudden chilling of the glass sheet as it is formed and about to pass through or leave the supplying-float or "debiteuse," and insure the production of a finished sheet of glass having high lustre and brilliancy, and no cold lines or other defects common in drawing sheet glass. Furthermore, the friction of the glass in passing through the upper section of the slot 15 as it approaches the slot 17 is materially reduced and the outer extremities of said slot 17 being slightly tapered or reduced in cross-section, the sheet of glass is sufficiently cooled or chilled at its edges to insure the proper drawing of the sheet and prevent any distortion or internal strain in the finished sheet.

From the foregoing description of the construction and arrangement of the elements of the supplying-float or "debiteuse" and manner of its operation, it will be seen that all the objects and advantages recited in the statement of invention have been fully and efficiently carried out, and while I have shown one and the preferred form of the same, it will be understood that many changes, or variations will readily suggest themselves without in any way departing from the present invention or evading the scope of the claims.

What I claim is:

1. A supplying-float for drawing a continuous sheet of glass having a slot with upper and lower openings and a pocket within and in each side wall of said slot and below the upper opening of the slot.

2. A supplying-float for drawing a continuous sheet of glass having a slot with elongated upper and lower openings and an elongated narrow groove within and in each side wall of said slot and below the upper opening of the slot.

3. A supplying-float for drawing a continuous sheet of glass having a slot with elongated upper and lower openings and an undercut elongated groove within and in each side wall of said slot and adjacent to and below the upper opening of the slot.

4. A supplying-float for drawing a continuous sheet of glass having a slot with elongated upper and lower openings and an undercut elongated groove within and in each side wall of said slot and adjacent to and below the upper opening of the slot, said grooves being arranged parallel and opposite to each other throughout their length and width.

5. A supplying-float for drawing a continuous sheet of glass having a slot with elongated upper and lower openings and a continuous narrow groove within and in each side wall of said slot and adjacent to and below the upper opening and extending to within a short distance of the edge of said upper opening.

6. A supplying-float for drawing a continuous sheet of glass having a slot with elongated upper and lower openings and a continuous narrow groove within and in each side wall of said slot and adjacent to and below the upper opening and extending to within a short distance of the edge of said upper opening, said grooves being arranged opposite to each other and parallel to each other and said upper opening.

7. A supplying-float for drawing a continuous sheet of glass having a slot with elongated upper and lower openings and an undercut narrow elongated groove within and in each side wall of said slot and adjacent to and parallel with and below the upper opening and extending to within a short distance of the edge of said upper opening.

8. A supplying-float for drawing a continuous sheet of glass having a slot with a lower opening, and an upper opening which is tapered from its medial section towards each of its ends and a narrow elongated pocket within and in each side wall of said slot and adjacent to and below the upper opening of the slot.

9. A supplying-float for drawing a continuous sheet of glass having a slot with a lower opening, and an upper elongated opening which is tapered from its medial section towards each of its ends and a groove within and in each side wall of said slot and adjacent and parallel to and below the upper opening of the slot.

10. A supplying-float for drawing a continuous sheet of glass having a slot with a lower opening, and an elongated upper opening which is tapered from its medial section towards each of its ends and an undercut narrow groove within and in each side wall of said slot and adjacent to and below the upper opening of the slot, said grooves being arranged opposite to and parallel to each other and said upper opening.

11. A supplying-float for drawing a continuous sheet of glass having a slot with an elongated lower opening which expands from its center towards each of its ends, and an elongated upper opening with the ends of less width than the intermediate section thereof and an undercut groove within and in each side wall of said slot adjacent to and below the upper opening and extending to within a short distance of the edge of the upper opening of the slot, said grooves being arranged parallel and opposite to each other throughout their length and width and parallel to the upper opening.

12. A supplying-float for drawing a continuous sheet of glass having a slot with a lower opening and an upper opening with the ends of less width than the intermediate section thereof and an undercut groove within and in each side wall of said slot and adjacent to and below the upper opening and extending to within a short distance of the edge of the upper opening of the slot.

13. A supplying-float for drawing a continuous sheet of glass having a slot with a lower opening and an elongated narrow upper opening with the ends of less width than the intermediate section thereof and an undercut groove within and in each side wall of said slot and adjacent to and below the upper opening and extending to within a short distance of the edge of the upper opening of the slot.

14. A supplying-float for drawing a continuous sheet of glass having a slot with an elongated lower opening and an elongated narrow upper opening with the ends of less width than the intermediate section thereof and an undercut groove within and in each side wall of said slot and adjacent to, parallel and below the upper opening and extending to within a short distance of the edge of the upper opening of the slot.

15. A supplying-float for drawing a continuous sheet of glass having a slot with an elongated lower opening which expands from its center towards each of its ends, and an elongated upper opening with the ends of less width than the intermediate section thereof and an undercut groove within and in each side wall of said slot adjacent to and below the upper opening and extending to within a short distance of the edge of the upper opening of the slot, said grooves being arranged parallel and opposite to each other throughout their length and width and parallel to the upper opening.

16. An elongated supplying-float for drawing a continuous sheet of glass having a raised or elevated outer edge on its upper face, said face sloping downwardly from its longitudinal center section towards each of its longitudinal sides and a slot with an upper opening at the highest portion of said upper face and a lower opening, and an undercut groove within and in each side wall of said slot and below the upper opening of the slot.

17. An elongated supplying-float for drawing a continuous sheet of glass having a raised or elevated outer edge on its upper face, said face sloping downwardly from its longitudinal center section towards each of its longitudinal sides and a slot with an elongated upper opening at the highest portion of said upper face and a lower opening, and a continuous narrow groove within and in each side wall of said slot and adjacent to and below the upper opening and extending to within a short distance of the edge of said upper opening.

18. An elongated supplying-float for drawing a continuous sheet of glass having a raised or elevated ridge on its upper face at each of its longitudinal edges and a broken elevated ridge on its upper face at each of its ends, said face sloping downwardly from its longitudinal center section towards each of its longitudinal sides and a slot with an upper opening at the highest portion of said upper face and a lower opening, and an undercut groove within and in each side wall of said slot and below the upper opening of the slot.

In testimony whereof, I hereunto affix my signature.

JULES J. QUERTINMONT.